United States Patent Office 3,122,555
Patented Feb. 25, 1964

---

3,122,555
1-ARYL-ω-(4-ALKOXY-4-ARYLPIPERIDINO) DERIVATIVES OF 1-ALKANOLS AND 1-ALKANONES
Paul A. J. Janssen, Vosselaar, near Turnhout, Belgium, assignor to Research Laboratorium Dr. C. Janssen, N.V., Beerse, Belgium, a company of Belgium
No Drawing. Filed Mar. 22, 1961, Ser. No. 97,423
9 Claims. (Cl. 260—293.4)

The present invention relates to 1-aroylalkyl-4-alkoxy-4-arylpiperidines and the alcohols obtained by reduction of the carbonyl group in the said ketones. These compounds can be represented by the general structural formula

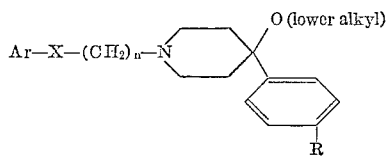

wherein X is a member of the group consisting of —CO— and —CHOH—; R is a member of the group consisting of hydrogen and methyl; n is a positive integer less than 5 when X is —CHOH— and n is an integer greater than 1 and less than 5 when X is —CO—; Ar is a member of the group consisting of phenyl, tolyl, fluorophenyl, methoxyphenyl, and thienyl. The lower alkyl radical can be methyl, ethyl, propyl, or butyl.

The organic bases of the foregoing type form pharmaceutically useful non-toxic salts with a variety of inorganic and strong organic acids including sulfuric, phosphoric, hydrochloric, hydrobromic, sulfamic, citric, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, methyl benzenesulfonate, ethyl toluenesulfonate, ethylene chlorohydrin, propylene chlorohydrin, allyl bromide, methallyl bromide and crotyl bromide.

The ketones of this invention can be prepared by the heating of a 1-aryl-ω-halo-1-alkanone of the formula Ar—CO—(CH$_2$)$_n$-Halogen with a 4-alkoxy-4-arylpiperidine of the formula

In the case where n=2 in the general formula, the compounds can also be prepared by heating acetophenone or a substituted acetophenone with formaldehyde and a 4-alkoxy-4-phenylpiperidine hydrochloride.

For the compounds where X is —CHOH—, several methods of preparation are available. A general method of preparation is the sodium borohydride reduction of the 1-(ω-aroylalkyl)-4-alkoxy-4-phenylpiperidines of this invention. When n=1, the alcohol can be prepared by heating a styrene oxide with a 4-alkoxy-4-phenylpiperidine. Two additional methods of preparation involve condensations of 4-alkoxy-4-phenylpiperidines with an appropriate substituted alkyl halide. In one case, the above piperidine is heated with a 1-aryl-ω-halo-1-alkanol of the formula Ar—CHOH—(CH$_2$)$_n$-Halogen to give the desired 1-aryl-ω-(4-alkoxy-4-arylpiperidino)-1-alkanol directly. Alternately, when n is greater than 1, the above piperidine can be heated with a 1-aryl-ω-halo-1-alkene to give an unsaturated compound of the formula

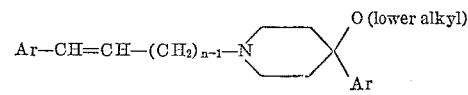

Hydrogen bromide is then added to the double bond to give the corresponding bromide which is subjected to mild hydrolysis to give the desired 1-aryl-ω-(4-alkoxy-4-arylpiperidino)-1-alkanol.

The aroylalkyl halides used as intermediates can be prepared conveniently by the Friedel-Crafts reaction including its milder variations employing, for example, γ-chlorobutyryl chloride and benzene or an appropriately substituted benzene such as toluene, chlorobenzene, fluorobenzene, or anisole. These intermediates can also be prepared by treating an ω-haloalkanonitrile with the appropriate arylmagnesium bromide followed by acid hydrolysis of the adduct.

The 4-alkoxy-4-arylpiperidine intermediates can be prepared by a series of reactions. An appropriately substituted α-methylstyrene is reacted with formaldehyde and ammonium chloride to give a 4-aryl-1,2,3,6-tetrahydropyridine. Reaction of the substituted pyridine with hydrogen bromide gives a 4-aryl-4-bromopiperidine which can be hydrolyzed to the corresponding 4-arylpiperidine-4-ol.

On heating a 4-arylpiperidine-4-ol with p-toluenesulfonyl chloride, 1-(4-tosyl)-4-arylpiperidin-4-ol having the formula

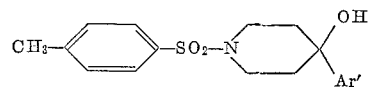

is obtained.

The tosylate is reacted, first with sodamide, and subsequently with an appropriate lower alkyl halide to give the 1-(4-tosyl)-4-alkoxy-4-arylpiperidine having the formula

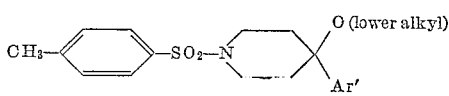

Treatment of the tosylate of a 4-alkoxy-4-arylpiperidine with sodium in butanol removes the tosylate group to yield the desired 4-alkoxy-4-arylpiperidine.

These compounds are active as anti-convulsants, which is specifically demonstrated by their antagonism of pentylenetetrazole-induced convulsions and of electrosthock seizures. This anti-convulsant activity is not possessed by the corresponding N-substituted 4-arylpiperidin-4-ols.

The compounds which constitute this invention and the methods for their preparation will appear more fully from a consideration of the following examples, which are given for the purpose of illustration only and are not to be construed as limiting the invention in spirit or in scope. In these examples, quantities are indicated as parts by weight, temperatures are expressed in degrees centigrade (°C.), and pressures are expressed in millimeters (mm.) of mercury.

Example 1

A Grignard reagent of m-fluorophenylmagnesium bromide is prepared by reacting 6.7 parts of magnesium with 94.5 parts of m-bromofluorobenzene in 80 parts of ether. Then 21 yarts of γ-chlorobutyronitrile in 64 parts of ether are added and the mixture is refluxed under nitrogen for two hours with stirring. The mixture is then allowed to stand at room temperature for 15 hours and the excess Grignard reagent is decomposed by the addition of 56 parts of concentrated hydrochloric acid and 50 parts of water. The organic layer is separated, dried over anhydrous sodium sulfate, filtered and concentrated under reduced pressure. The residue is distilled to yield γ-chloro-m-fluorobutyrophenone boiling at about 105–125° C. at 2 mm. pressure.

By substituting o-bromotoluene for m-bromofluorobenzene in the above procedure, γ-chloro-2-methylbutyrophenone is obtained.

*Example 2*

To a suspension of 341 parts of aluminum chloride in 1740 parts of carbon disulfide are added 96 parts of fluorobenzene with stirring and cooling. While the temperature is maintained at about 10° C., 141 parts of γ-chlorobutyryl chloride is added. When the addition is complete the cooling bath is removed and the stirring is continued for 2 hours. The reaction mixture is poured into ice water, and the organic layer is separated, washed with water, dried over anhydrous sodium sulfate and filtered. The filtrate is concentrated under reduced pressure and the residue is distilled to yield γ-chloro-4-fluorobutyrophenone boiling at about 136–142° C. at 6 mm. pressure.

*Example 3*

A mixture of 84 parts of thiophene, 141 parts of γ-chlorobutyryl chloride and 870 parts of benzene is cooled to about 0° C. While this temperature is maintained, 260 parts of stannic chloride is added over a period of 2 hours. After the addition is completed, the cooling bath is removed and stirring is continued for one hour. The reaction mixture is then poured into a mixture of 60 parts of concentrated hydrochloric acid and 450 parts of ice water. The organic layer is separated, washed with water, dried over anhydrous calcium chloride, and filtered. The filtrate is concentrated under reduced pressure. The residue is distilled to yield 2-(γ-chlorobutyryl)thiophene which boils at about 144–146° C. at 11 mm. pressure.

*Example 4*

A mixture of 856 parts of ammonium chloride and 3000 parts of 36% formaldehyde is stirred and heated at about 60° C. While cooling to maintain this temperature, 944 parts of α-methylstyrene is added slowly. After the addition is completed, the mixture is stirred at room temperature until the temperature of the mixture drops to about 40° C. After 2000 parts of methanol is added, the stirring is continued for 20 hours. The methanol is removed under reduced pressure and the residue is diluted with 2500 parts of concentrated hydrochloric acid. The mixture is heated for 4 hours with stirring at a temperature of 100° C. The mixture is then cooled, diluted with 2000 parts of water, made alkaline with sodium hydroxide and extracted with benzene. The extract is dried, filtered, and the filtrate is distilled. The residue is distilled under vacuum to yield 4-phenyl-1,2,3,6-tetrahydropyridine which boils at about 97–112° C. at 1 mm. pressure. The hydrochloride of the compound is prepared by passing dry hydrogen chloride gas through a benzene solution of the base. The hydrochloride melts at about 199–202° C.

While the temperature is maintained at about 10–20° C., anhydrous hydrogen bromide gas is passed for 7 hours through a solution of 160 parts of 4-phenyl-1,2,3,6-tetrahydropyridine in 500 parts of acetic acid. The mixture is stirred during the addition of the hydrogen bromide gas. After allowing the mixture to stand for 16 hours, the acetic acid and excess hydrogen bromide are removed under vacuum at a bath temperature of less than 40° C. The residue is suspended in ether. From this suspension the precipitate is collected on a filter. It is then recrystallized from a mixture of acetone and 2-propanol to yield 4-phenyl-4-bromopiperidine hydrobromide melting at about 209.5–210.5° C.

A solution of 160 parts of this hydrobromide in 3000 parts of water is treated with 100 parts of 20% sodium hydroxide solution. The resultant precipitate is recovered by filtration, washed with water and then dissolved in 1500 parts of boiling toluene. The solution is dried and then chilled at 0° C. to yield 4-phenylpiperidin-4-ol melting at about 159–160° C.

By following the above procedure and substituting an equimolar amount of α,4-dimethlystyrene for the α-methylstyrene the following compounds are obtained:

4-(4-tolyl)-1,2,3,6-tetrahydropyridine boiling at about 162–170° C. at 10 mm. pressure.

4-(4-tolyl)-4-bromopiperidine hydrobromide melting at about 190–192° C.

4-(4-tolyl)piperidin-4-ol melting at about 136–137° C.

*Example 5*

To a mixture of 35 parts of 4-phenylpiperidin-4-ol and 63.5 parts of sodium carbonate in 480 parts of 4-methyl-2-pentanone is added portionwise a solution of 52 parts of p-toluenesulfonyl chloride in 120 parts of 4-methyl-2-pentanone with stirring and gentle hearing. After the addition is complete, refluxing and stirring are continued for about 16 hours. The reaction mixture is cooled and 200 parts of water is added. The water layer is separated and extracted with 100 parts of chloroform. The organic layers are combined, dried over potassium carbonate and concentrated to a volume of about 150 parts. The solid which precipitates is filtered, washed and dried to yield 1-(4-tosyl)-4-phenylpiperidin-4-ol melting at about 183–184° C.

*Example 6*

To a suspension of 9.8 parts of sodamide in 280 parts of toluene is added 69 parts of 1-(4-tosyl)-4-phenylpiperidin-4-ol. The mixture is stirred and refluxed until evolution of ammonia ceases. After cooling 45 parts of methyl iodide is added and the mixture is stirred and refluxed for 5 hours before it is cooled and 150 parts of water is added. A small amount of insoluble material is removed by filtration. The organic layer is separated, dried over magnesium sulfate, filtered and cooled to 0° C. to give 1-(4-tosyl)-4-methoxy-4-phenylpiperidine melting at about 129–130.2° C.

*Example 7*

To a suspension of 8.3 parts of sodamide in 256 parts of toluene is added 58 parts of 1-(4-tosyl)-4-phenylpiperidin-4-ol. The mixture is stirred and refluxed for 1 hour until no more ammonia gas is evolved. After cooling to room temperature, 52 parts of ethyl iodide is added and the mixture is stirred and refluxed for 16 hours. The reaction mixture is again cooled and 150 parts of water is added. The precipitate is filtered and the toluene layer is separated from the filtrate. The organic layer is dried over magnesium sulfate, filtered and evaporated. The residue is recrystallized from diisopropyl ether to give 1-(4-tosyl)-4-ethoxy-4-phenylpiperidine melting at about 124.4–125.2° C.

*Example 8*

Under a nitrogen atmosphere, 58 parts of 1-(4-tosyl)-4-phenylpiperidin-4-ol is added to a suspension of 8.3 parts of sodamide in 256 parts of toluene. The mixture is stirred and refluxed for 1 hour until ammonia evolution ceases. After cooling the reaction mixture to room temperature, 48.8 parts of 1-bromopropane is added and the mixture is refluxed and stirred for about 21 hours. The reaction mixture is again cooled before 250 parts of water is added. Filtration removes the unreacted starting material and the organic layer is separated and dried over magnesium sulfate and evaporated. Recrystallization of the residue from diisopropyl ether yields 1-(4-tosyl)-4-propoxy-4-phenylpiperidine melting at about 125.5–127° C.

Substitution of an equivalent quantity of 1-bromobutane for the 1-bromopropane in the above example gives 1-(4-tosyl)-4-butoxy-4-phenylpiperidine melting at about 141–143° C.

Example 9

A solution of 46.5 parts of 1-(4-tosyl)-4-methoxy-4-phenylpiperidine in 1080 parts of 1-butanol is heated to reflux under a nitrogen atmosphere. Then 93 parts of sodium is added portionwise over a period of 1 hour. After this addition is complete, the mixture is refluxed for 1.5 hours until all of the sodium is dissolved. It is then cooled to room temperature and decomposed by the dropwise addition of 400 parts of water. The layers are separated and the aqueous layer is extracted with toluene. The organic extract is added to the first butanol solution and the combined solution is washed three times with 100 parts of water. After evaporation of the solvent the oily residue is dissolved in 400 parts of diisopropyl ether and hydrogen chloride gas is introduced into the solution. The precipitated hydrochloride is filtered off, washed with ether and dried to give 4-methoxy-4-phenylpiperidine hydrochloride melting at about 212–215° C.

Substitution of an equivalent quantity of 1-(4-tosyl)-4-ethoxy-4-phenylpiperidine for the 1-(4-tosyl)-4-methoxy-4-phenylpiperidine in the above example yields 4-ethoxy-4-phenylpiperidine hydrochloride melting at about 170–171° C.

If an equivalent quantity of 1-(4-tosyl)-4-propoxy-4-phenylpiperidine is substituted for the 1-(4-tosyl)-4-methoxy-4-phenylpiperidine of the above example there is obtained 4-propoxy-4-phenylpiperidine hydrochloride melting at about 174–175.2° C.

By substitution of an equivalent quantity of 1-(4-tosyl)-4-butoxy-4-phenylpiperidine for the 1-(4-tosyl)-4-methoxy-4-phenylpiperidine of the above example there is obtained 4-butoxy-4-phenylpiperidine hydrochloride melting at about 117–119.4° C.

To obtain the oxalate of 4-methoxy-4-phenylpiperidine a slight modification of the above procedure is used. In this instance the residue remaining after the evaporation of the solvent from the butanol solution is dissolved in a mixture of benzene and water. The benzene layer is separated, dried, filtered and evaporated. The residue is dissolved in 180 parts of 2-propanol and boiled for 5 minutes with a solution of 17.1 parts of oxalic acid dihydrate in 120 parts of 2-propanol. After filtration and cooling this yields 4-methoxy-4-phenylpiperidine oxalate melting at about 160.1–160.4° C.

Example 10

To a stirred mixture of 38.5 parts of 4-(4-tolyl)piperidin-4-ol 63.6 parts of sodium carbonate and a few crystals of potassium iodide in 480 parts of 4-methyl-2-pentanone is added portionwise a solution of 53.5 parts of p-toluenesulfonyl chloride in 120 parts of 4-methyl-2-pentanone. After the addition is complete the mixture is refluxed for 17 hours. The mixture is cooled to about 35° C. and 200 parts of water is added. The water layer is separated and extracted with chloroform. The combined organic layers are dried, filtered and concentrated to about 150 parts. The solid which precipitates is filtered off and washed with 4-methyl-2-pentanone yielding 1-(4-tosyl)-4-(p-tolyl)piperidin-4-ol melting at about 165–166.8° C.

A mixture of 60 parts of 1-(4-tosyl)-4-(p-tolyl)piperidin-4-ol 8.3 parts of sodamide and 256 parts of toluene is refluxed until ammonia evolution stops. The reaction mixture is cooled to about 30° C. and 46.8 parts of methyl iodide is added portionwise. After the addition is complete heating is continued for 6 hours. The mixture is then cooled to room temperature and excess sodamide is decomposed by addition of 100 parts of water. The reaction mixture is filtered and the solid is washed with toluene and dried to yield 1-(4-tosyl)-4-methoxy-4-(p-tolyl)piperidine melting at about 155–155.5° C.

A solution of 55 parts of 1-(4-tosyl)-4-methoxy-4-(p-tolyl)piperidine in 984 parts of 1-butanol is heated to reflux and 105.5 parts of sodium is added portionwise over about 1.5 hours. Refluxing is continued for an additional hour before the mixture is cooled to room temperature. The thick slurry is decomposed by careful addition of 240 parts of water. The organic solution is decanted and the remaining aqueous solution is diluted with 400 parts of water and extracted with two portions of toluene. The combined butanol and toluene solutions are washed with water, dried and evaporated. The residual oil is dissolved in diisopropyl ether and dry hydrogen chloride is introduced into the solution to give 4-methoxy-4-(p-tolyl)piperidine hydrochloride melting at about 193–194° C.

Example 11

A mixture of 4.5 parts of 4-methoxy-4-phenylpiperidine, 8.3 parts of sodium carbonate, and a few crystals of potassium iodide in 80 parts of 4-methyl-2-pentanone is added portionwise to a solution of 6 parts of β-chloropropiophenone in 16 parts of 4-methyl-2-pentanone. After the addition is complete the mixture is refluxed for 20 hours. The reaction mixture is cooled and filtered to remove inorganic solids and the filtrate is evaporated. The residue is boiled with 80 parts of diisopropyl ether and the resultant hot solution is filtered to remove insoluble material. Diisopropyl ether is added to the filtrate to bring the volume to about 200 parts and hydrogen chloride gas is introduced into the solution. The precipitated solid is filtered and triturated with a mixture of 40 parts of acetone and 40 parts of 2-propanol. After drying, this gives 1-(β-benzoylethyl)-4-methoxy-4-phenylpiperidine hydrochloride melting at about 199–202° C.

Example 12

A mixture of 5.4 parts of acetophenone, 1.35 parts of paraformaldehyde, 11 parts of 4-ethoxy-4-phenylpiperidine hydrochloride and a few drops of hydrochloric acid in 120 parts of 2-propanol is refluxed for 1 hour. Another 1.35 parts of paraformaldehyde is added to the mixture after it has cooled and this is refluxed for 3 hours. Finally, a third portion of 1.35 parts of paraformaldehyde is added and refluxing is continued for 3 hours. The reaction mixture is cooled at −15° C. to yield 1-(β-benzoylethyl)-4-ethoxy-4-phenylpiperidine hydrochloride melting at about 179–181° C. The free base of this compound has the formula

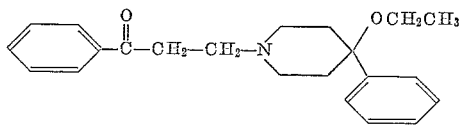

Example 13

A mixture of 2.68 parts of 4-methylacetophenone, 0.6 part of paraformaldehyde, 3.8 parts of 4-methoxy-4-phenylpiperidine hydrochloride and a few drops of hydrochloric acid in 32 parts of 2-propanol is refluxed for 1 hour. After the mixture is cooled and another 0.6 part of paraformaldehyde is added, refluxing is resumed for 3 hours. Then 240 parts of acetone is added and the mixture is allowed to stand at room temperature. The solid which separates is filtered off and recrystallized from 2-propanol to give 1-[β-(4-methylbenzoyl)ethyl]-4-methoxy-4-phenylpiperidine hydrochloride melting at about 202.5–203.4° C.

Example 14

After a mixture of 8.4 parts of 4-fluoroacetophenone, 1.8 parts of paraformaldehyde, 11.4 parts of 4-methoxy-4-phenylpiperidine hydrochloride, 96 parts of 2-propanol and a few drops of hydrochloric acid is refluxed for 1 hour, the mixture is cooled and a second portion of 1.8 parts of paraformaldehyde is added before refluxing is resumed for an additional 3 hours. The reaction mixture is filtered and the precipitate is recrystallized first from 120 parts of acetone and subsequently from 2-propanol to yield 1-[β-(4-fluorobenzoyl)ethyl]-4-methoxy-4- phenylpiperidine hydrochloride melting at about 218–219° C. If 4-methoxyacetophenone is substituted for 4-fluoroacetophenone in the above procedure the product is 1-[β-(4-methoxybenzoyl)ethyl] - 4-methoxy-4-phenyl-piperidine hydrochloride melting at about 192–195° C.

Example 15

A mixture of 5 parts of 2-acetylthiophene, 1.5 parts of paraformaldehyde, 9 parts of 4-methoxy-4-phenylpiperidine hydrochloride and 80 parts of 2-propanol is boiled for 1 hour. After cooling the mixture to add 1 part of paraformaldehyde, refluxing is resumed for 2 hours. Finally, a third portion of 1 part of paraformaldehyde is added and the mixture is refluxed for 5 hours. By cooling the reaction mixture overnight at −15° C. there is obtained 1-[β-(2-thenoyl)ethyl] - 4 - methoxy - 4-phenyl-piperidine hydrochloride melting at about 199–203.5° C.

Example 16

A mixture of 3.7 parts of 2-acetylthiophene, 1.2 parts of paraformaldehyde, 7.5 parts of 4-ethoxy-4-phenylpiperidine hydrochloride and 80 parts of 2-propanol is stirred and refluxed for 1 hour. The reaction mixture is cooled, mixed with 1 part of paraformaldehyde, refluxed for 2 hours, cooled again, mixed with an additional 1 part of paraformaldehyde, refluxed for 5 hours, and finally cooled to −15° C. Filtration gives 1-[β-(2-thenoyl)ethyl]-4-ethoxy-4-phenylpiperidine hydrochloride melting at about 181–182° C.

Example 17

From 6.83 parts of 4-methoxy-4-phenylpiperidine hydrochloride the free base is liberated by dissolving the salt in water, making the solution alkaline, extracting with benzene-ether and evaporating the organic solvent. The residual crude base is dissolved in 120 parts of 4-methyl-2-pentanone and there is added 9.5 parts of sodium carbonate, 0.1 part of potassium iodide, and 7.64 parts of γ-chlorobutyrophenone. The mixture is stirred and refluxed for 60 hours and then filtered hot. After washing the filter cake with hot 4-methyl-2-pentanone the combined filtrates are treated with charcoal, filtered, and evaporated. The oily residue is dissolved in dry diisopropyl ether and dry hydrogen chloride gas is introduced into the solution. The precipitated solid is filtered off and recrystallized first from 2-propanol and subsequently from butanone to yield 1-(γ-benzoylpropyl)-4-methoxy - 4 - phenylpiperidine hydrochloride melting at about 205–206° C. The free base has the formula

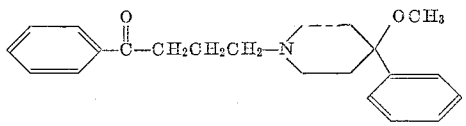

Example 18

A mixture of 6.38 parts of γ-chlorobutyrophenone, 7.23 parts of 4-ethoxy-4-phenylpiperidine isolated from its hydrochloride by evaporating the solvent from the benzene extract of an alkalized aqueous solution of the salt, 10.5 parts of sodium carbonate, 0.1 part of potassium iodide and 200 parts of 4-methyl-2-pentanone is stirred and refluxed for 48 hours. After cooling the reaction mixture it is filtered and the solvent is evaporated from the filtrate. The residue is dissolved in anhydrous ether and hydrogen chloride gas is passed through the solution. The precipitated hydrochloride is filtered off, dried, and recrystallized from acetone to give 1 - (γ - benzoylpropyl) - 4-ethoxy-4-phenylpiperidine hydrochloride melting at 167–168.5° C.

Example 19

A mixture of 6.4 parts of γ-chlorobutyrophenone, 6.5 parts of 4-propoxy-4-phenylpiperidine which is isolated from its hydrochloride by evaporation of the solvent from the benzene extract of an alkalized aqueous solution of the hydrochloride, 1.54 parts of sodium carbonate and 0.1 part of potassium iodide in 280 parts of 4-methyl-2-pentanone is stirred and refluxed for 55 hours. The reaction mixture is filtered and the solvent is evaporated from the filtrate. The oily residue is dissolved in 560 parts of diisopropyl ether and filtered and hydrogen chloride gas is introduced into the filtrate. The precipitated hydrochloride is boiled in 320 parts of ethyl acetate and subsequently cooled at 0° C. to give 1-(γ-benzoylpropyl)-4-propoxy - 4 - phenylpiperidine hydrochloride melting at 169–172° C.

Example 20

The free base is liberated from 6.83 parts of 4-methoxy-4-phenylpiperidine hydrochloride by the procedure given in Example 17. This base is dissolved in 120 parts of 4-methyl-2-pentanone and there are added successively 9.5 parts of sodium carbonate, 0.1 part of potassium iodide and 8.4 parts of γ-chloro-4-fluorobutyrophenone. After stirring and refluxing the mixture for 60 hours, it is filtered hot and the filter cake is washed with warm 4-methyl-2-pentanone. The solvent is evaporated from the filtrate and the oily residue is dissolved in 400 parts of diisopropyl ether. Some insoluble matter is removed by filtration and the solution is saturated with dry hydrogen chloride gas. The precipitated solid is recrystallized from 2-propanol to give 1-[γ-(4-fluorobenzoyl)propyl]-4-methoxy-4-phenylpiperidine hydrochloride melting at about 226–227.5° C.

The free base of this compound melts at about 75.8–76.8° C.

By substituting the appropriate starting materials in the above procedure, the following compounds are obtained:

1-[γ - (3 - fluorobenzoyl)propyl]-4-methoxy-4-phenyl-piperidine hydrochloride.

1 - [γ-(2-methylbenzoyl)propyl]-4-methoxy-4-phenyl-piperidine hydrochloride.

Example 21

The free base from 6 parts of 4-methoxy-4-(4-tolyl)piperidine hydrochloride is dissolved in 120 parts of 4-methyl-2-pentanone. To this solution is added 8 parts of sodium carbonate, 0.1 part of potassium iodide and 7 parts of γ-chloro-4-fluorobutyrophenone. The mixture is stirred and refluxed for 48 hours. After filtering the hot reaction mixture, the filtrate is treated with charcoal, filtered, and evaporated. The oily residue is first recrystallized from petroleum ether and then from diisopropyl ether to give 1-[γ-(4-fluorobenzoyl)propyl]-4-methoxy-4-(4-tolyl)piperidine melting at about 81–82° C.

Example 22

A mixture of 8 parts of γ-chloro-4-fluorobutyrophenone, 7.2 parts of 4-ethoxy-4-phenylpiperidine isolated from its hydrochloride by the procedure of Example 18, 10.6 parts of sodium carbonate, 0.1 part of potassium iodide and 280 parts of 4-methyl-2-pentanone is stirred and refluxed for 60 hours. After cooling, the reaction mixture is filtered and the filtrate is evaporated. The oily residue is dissolved in 400 parts of diisopropyl ether and hydrogen chloride is introduced into the solution. The precipitated hydrochloride is filtered off and recrystallized from ethyl acetate to give 1-[γ-(4-fluorobenzoyl)propyl]-4-ethoxy-4-phenylpiperidine hydrochloride melting at about 171.2–173° C.

The free base of this compound melts at about 63.2–63.8° C.

Example 23

From 6.39 parts of 4-phenyl-4-propoxypiperidine hydrochloride the free base is obtained by the procedure in Example 19. The resultant amine is dissolved in 120 parts of 4-methyl-2-pentanone together with 7 parts of γ-chloro-4-fluorobutyrophenone, 8 parts of sodium carbonate and 0.1 part of potassium iodide. After refluxing the mixture for 40 hours it is filtered hot. Evaporation of the solvent from the filtrate leaves an oily residue which is dissolved in 320 parts of diisopropyl ether. Introduction of hydrogen chloride gas into the solution precipitates the oily hydrochloride. The solvent is decanted and the residue is triturated with acetone. Recrystallization of the resultant solid from acetone gives 1 - [γ-(4 - fluorobenzoyl)propyl]-4-propoxy-4-phenyl-piperidine hydrochloride melting at about 178.5–180° C.

Example 24

The free base is liberated from 4.6 parts of 4-butoxy-4-phenylpiperidine hydrochloride by evaporation of the solvent from the benzene/ether extracts of the alkalized aqueous solution of the salt. The oily amine is stirred and refluxed for 40 hours in 120 parts of 4-methyl-2-pentanone together with 4.76 parts of γ-chloro-4-fluoro-butyrophenone, 5.4 parts of sodium carbonate and 0.1 part of potassium iodide. The hot reaction mixture is filtered and the solvent is evaporated. The oily residue is dissolved in diisopropyl ether and introduction of hydrogen chloride gas into the solution yields an oily hydrochloride. This is dissolved in water, alkalized, and extracted with benzene and ether. After drying the solution over magnesium sulfate the solvent is evaporated leaving an oily residue which is dissolved in 80 parts of 2-propanol and mixed with a solution of 1 part of oxalic acid dihydrate in 12 parts of 2-propanol. Cooling gives 1 - [γ-(4 - fluorobenzoyl)propyl]-4 - butoxy-4-phenyl-piperidine oxalate melting at about 147.6–149° C.

Example 25

The free base from 6.83 parts of 4-methoxy-4-phenyl-piperidine hydrochloride is dissolved in 120 parts of 4-methyl-2-pentanone together with 8 parts of 2-(γ-chloro-butyryl)thiophene, 9.5 parts of sodium carbonate and 0.1 part of potassium iodide. After refluxing this mixture for 24 hours it is filtered hot. Evaporation of the solvent leaves an oily residue which is treated with 400 parts of diisopropyl ether. Introduction of hydrogen chloride gas into the resultant solution precipitates the hydrochloride which is recrystallized from methanol to give 1-[γ-(2-thenoyl)propyl]-4-methoxy-4-phenylpiperi-dine hydrochloride melting at about 234.5–235° C.

Example 26

A mixture of 8 parts of δ-chlorovalerophenone, 15 parts of 4-methoxy-4-phenylpiperidine, 0.1 part of potassium iodide and 80 parts of anhydrous toluene is heated in a sealed tube for 72 hours at 150° C. After cooling, the reaction mixture is poured into water. The organic layer is separated, dried over potassium carbonate and evaporated. The residue is dissolved in anhydrous ether and hydrogen chloride gas is introduced into the solution. The precipitated hydrochloride is filtered off and boiled in acetone to give, after filtration, 1-(δ-benzoylbutyl)-4-methoxy-4-phenylpiperidine hydrochloride melting at about 185–187° C.

Example 27

A mixture of 4.5 parts of δ-chlorovalerophenone, 5 parts of 4-ethoxy-4-phenylpiperidine, 8.5 parts of sodium carbonate, 0.1 part of potassium iodide, and 160 parts of 4-methyl-2-pentanone is stirred and refluxed for 48 hours. The cooled reaction mixture is filtered. Evaporation of the solvent from the filtrate leaves a residue which is dissolved in anhydrous ether. Hydrogen chloride gas is introduced into the ether solution and the precipitated hydrochloride is filtered off and recrystallized from a mixture of acetone and 2-propanol to give 1-(δ-benzoylbutyl)-4-ethoxy-4-phenylpiperidine hydrochloride melting at about 150–152° C.

Example 28

A mixture of 8 parts of δ-chlorovalerophenone, 8.5 parts of 4-phenyl-4-propoxypiperidine isolated from its hydro-chloride, 10.6 parts of sodium carbonate and 0.1 part of potassium iodide in 280 parts of 4-methyl-2-pentanone is stirred and refluxed for 40 hours. The reaction mixture is filtered and the filtrate is evaporated. The semi-solid residue is dissolved in 2-propanol and mixed with a solution of 3.7 parts of oxalic acid dihydrate in 240 parts of 2-propanol. Cooling the solution at 0° C. causes the formation of a precipitate which is filtered off and recrystallized from 2-propanol to give 1-(δ-benzoylbutyl)-4-propoxy-4-phenylpiperidine oxalate melting at about 184–187° C.

Example 29

A mixture of 3 parts of styrene oxide and 4.5 parts of 4-methoxy-4-phenylpiperidine isolated from its hydrochloride by the procedure given in Example 17 is heated at 100° C. for 20 hours. After cooling, the solid is filtered off and recrystallized from a mixture of 2-propanol and diisopropyl ether. This gives 1-phenyl-2-(4-methoxy-4-phenylpiperidino)-1-ethanol melting at about 114.2–115.8° C. and having the formula

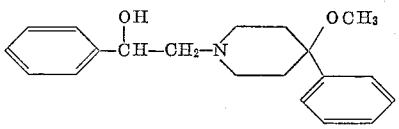

Example 30

With stirring a mixture of 2.5 parts of styrene oxide and 4 parts of 4-ethoxy-4-phenylpiperidine, isolated from its hydrochloride by the procedure of Example 18, is heated at 100° C. for 20 hours. The reaction mixture is cooled and the precipitated solid is filtered off and recrystallized from 2-propanol to yield 1-phenyl-2-(4-ethoxy-4-phenyl-piperidino)-1-ethanol melting at about 111–111.8° C.

Example 31

A mixture of 3.3 parts of styrene oxide and 6 parts of 4-phenyl-4-propoxypiperidine isolated from its hydrochloride by the procedure given in Example 19 is heated at 100–110° C. for 20 hours. After cooling the resultant precipitate is filtered off and recrystallized from 2-propa-nol to give 1-phenyl-2-(4-propoxy-4-phenyl-piperidino)-1-ethanol melting at about 94–96.4° C.

Example 32

From 8.1 parts of 1-(β-benzoylethyl)-4-methoxy-4-phenylpiperidine hydrochloride the free base is obtained by dissolving the salt in water, alkalizing it, extracting with benzene-ether solution and evaporating the solvent. The residual base is dissolved in 26 parts of ethanol and stirred while 0.209 part of sodium borohydride is added at room temperature. Stirring is continued for 2 hours at room temperature during which time a solid precipitate forms. The mixture is decomposed by first adding 2.2 parts of concentrated hydrochloric acid and subsequently 8.8 parts of water. The solvent is evaporated. The residue is alkalized with 40% sodium hydroxide solution and extracted with benzene. The benzene solution is dried over magnesium sulfate after the solvent is evaporated. The oily residue is dissolved in 400 parts of diisopropyl ether and hydrogen chloride gas is introduced into the solution. The hydrochloride which precipitates is filtered off and recrystallized from methanol to give 1-phenyl-3-(4-methoxy-4-phenylpiperidino)-1-propanol hydrochloride melting at about 220–222° C.

Example 33

An aqueous solution of 5.5 parts of 1-(β-benzoylethyl)-4-ethoxy-4-phenylpiperidine hydrochloride is alkalized and extracted with ether. After evaporation of the ether, the residue is dissolved in 120 parts of ethanol. To this solution is added portionwise 0.4 part of sodium borohydride and the mixture is stirred for 2 hours. The mixture is decomposed with 20 parts of 2 N hydrochloric acid and evaporated. An aqueous solution of the residue is alkalized with 100 parts of 10% sodium hydroxide and extracted with chloroform. The organic layer is dried over potassium carbonate, filtered and evaporated. The residue is treated with diisopropyl ether. Hydrogen chloride gas is passed through the solution and the resultant precipitate is filtered and recrystallized from acetone. This gives 1-phenyl-3-(4-ethoxy-4-phenyl-piperidino) - 1 - propanol hydrochloride melting at about 181–182° C.

*Example 34*

A mixture of 2.5 parts of 1-[β-(4-methylbenzoyl)-ethyl]-4-methoxy-4-phenylpiperidine, 0.3 part of sodium borohydride and 64 parts of ethanol is stirred for 10 hours. After evaporation of the solvent from the reaction mixture the residue is decomposed with 20 parts of 10% hydrochloric acid. The aqueous solution is alkalized and extracted with chloroform and the chloroform solution is dried over potassium carbonate, filtered, and evaporated. The residue is dissolved in anhydrous ether and hydrogen chloride gas is introduced into the solution. The resultant hydrochloride is recrystallized from acetone to give 1-(4-tolyl)-3-(4-methoxy-4-phenylpiperidino) - 1 - propanol hydrochloride melting at about 187–188° C.

If the above procedure is followed in reducing 1-[β-(4-methoxybenzoyl)ethyl]-4-methoxy-4 - phenylpiperidine with sodium borohydride, the product is 1-(4-methoxyphenyl)-3-(4-methoxy-4-phenylpiperidino)-1-propanol hydrochloride melting at about 188.2–190.4° C.

*Example 35*

An aqueous solution of 7 parts of 1-[β-(4-fluorobenzoyl)ethyl]-4-methoxy-4-phenylpiperidine is alkalized and extracted with chloroform. After drying and evaporation of the chloroform solution the residue is dissolved in 80 parts of ethanol. To this solution is added portionwise 0.38 part of sodium borohydride and the mixture is stirred for 2 hours at room temperature. After the mixture is decomposed with 30 parts of 5 N hydrochloric acid, then the solvent is evaporated. The residue is dissolved in 200 parts of water. The aqueous solution is alkalized and extracted with chloroform and the chloroform layer is dried over magnesium sulfate and evaporated. The residue is dissolved in a mixture of 240 parts of ether and 40 parts of 2-propanol and hydrogen chloride gas is introduced into the solution. After cooling the solution for 1 hour at 0° C. the hydrochloride is filtered off and recrystallized from 2-propanol to give 1-(4-fluorophenyl)-3-(4-methoxy-4-phenylpiperidino)-1-propanol hydrochloride which melts at about 201–202° C. The free base of this compound has the formula

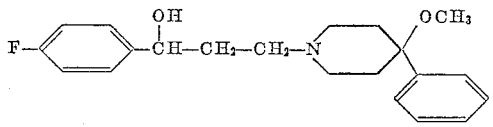

*Example 36*

A mixture of 5.5 parts of 1-[β-(2-thenoyl)ethyl]-4-methoxy-4-phenylpiperidine which is isolated from its hydrochloride by evaporation of the solvent from the extraction of an alkalized aqueous solution of the hydrochloride, 0.48 part of sodium borohydride and 160 parts of ethanol is stirred for 15 hours at room temperature. Decomposition of the reaction mixture with 35 parts of 5 N hydrochloric acid is followed by alkalization with sodium hydroxide. The mixture is extracted with chloroform. The organic layer is separated, dried over potassium carbonate, filtered and evaporated. The oily residue is dissolved in 400 parts of diisopropyl ether and hydrogen chloride gas is introduced into the solution. The ether is decanted and the residue is recrystallized first from ethyl acetate and subsequently from 2-propanol to give 1-(2-thienyl)-3-(4 - methoxy-4-phenylpiperidino)-1-propanol hydrochloride melting at about 202–203° C.

*Example 37*

After isolation from its hydrochloride 3.5 parts of 1-[β-(2 - thenoyl)ethyl]-4-ethoxy-4-phenylpiperidine is stirred for 10 hours at room temperature with 0.38 part of sodium borohydride and 80 parts of ethanol. The mixture is decomposed with 10% hydrochloride acid. The solvent is evaporated and the residue is dissolved in water. After alkalization of the aqueous solution with sodium hydroxide and extraction with chloroform the organic layer is dried over potassium carbonate, filtered and evaporated. The residue is dissolved in anhydrous ether and hydrogen chloride gas is introduced into the solution to precipitate the hydrochloride which is filtered off and recrystallized from acetone. The product, 1-(2-thienyl)-3-(4-ethoxy-4-phenylpiperidino)-1-propanol hydrochloride, melts at about 150–151.5° C.

*Example 38*

A mixture of 3.5 parts of 1-(γ-benzoylpropyl)-4-methoxy-4-phenylpiperidine which is isolated by evaporation of the solvent from the extraction of an alkalized aqueous solution of the corresponding hydrochloride, 0.38 part of sodium borohydride and 120 parts of ethanol is stirred for 10 hours at room temperature. The mixture is decomposed with 30 parts of 5 N hydrochloric acid. After evaporation of the solvent the residue is dissolved in water and the resultant aqueous solution is alkalized with sodium hydroxide and extracted with chloroform. The chloroform solution is dried over potassium carbonate, filtered and evaporated. The residue is dissolved in ether and hydrogen chloride gas is introduced into the solution. The precipitated hydrochloride is filtered off and dried to give 1-phenyl-4-(4-methoxy-4-phenylpiperidino)-1-butanol hydrochloride melting at about 198–199° C.

Substitution of an equivalent quantity of 1-(γ-benzoylpropyl)-4-ethoxy-4-phenylpiperidine for the 1-(γ-benzoylpropyl)-4-methoxy-4-phenylpiperidine in the above example gives 1-phenyl-4-(4-ethoxy-4-phenylpiperidino)-1-butanol hydrochloride melting at about 173–176° C.

If an equivalent quantity of 1-(γ-benzoylpropyl)-4-phenyl-4-propoxypiperidine is substituted for the 1-(γ-benzoylpropyl)-4-methoxy-4-phenylpiperidine in the above example the product is 1-phenyl-4-(4-phenyl-4-propoxypiperidino)-1-butanol hydrochloride. After recrystallization from ethyl acetate this hydrochloride melts at about 157–159° C.

*Example 39*

Four parts of 1-[γ-(4-fluorobenzoyl)propyl]-4-methoxy-4-phenylpiperidine is isolated by evaporation of the solvent from the extracts of the alkalized aqueous solution of the hydrochloride. This base is dissolved in 240 parts of ethanol and 0.42 part of sodium borohydride is added portionwise. After the addition is complete the mixture is stirred for 2 days at room temperature and the solvent is evaporated. The residue is decomposed with 2 N hydrochloride acid and alkalized and the mixture is extracted with chloroform. The chloroform solution is dried over potassium carbonate, filtered and evaporated and the oily residue is dissolved in 560 parts of warm diisopropyl ether. Introduction of hydrogen chloride gas into the ether solution precipitates the hydrochloride which is recrystallized from a mixture of 240 parts of acetone and 48 parts of 2-propanol to give 1-(4-fluoro-phenyl)-4-(4-methoxy-4-phenylpiperidino)-1 - butanol hydrochloride melting at about 199–200° C.

Substitution of an equivalent quantity of 1-[γ-(4-fluorobenzoyl)propyl]-4-methoxy-4-(4-tolyl)-piperidine hydrochloride for the 1-[γ-(4-fluorobenzoyl)-propyl]-4-methoxy-4-phenylpiperidine in the above procedure gives 1-(4-fluorophenyl) - 4 - [4-methoxy-4-(4-tolyl)piperidino]-1-butanol hydrochloride.

*Example 40*

If an equivalent quantity of 1-[γ-(4-fluorobenzoyl)- propyl]-4-ethoxy-4-phenylpiperidine is substituted for the 1-[γ-(4-fluorobenzoyl)propyl]-4-methoxy-4-phenylpiperidine in Example 39 and the procedure of that example is repeated, the product is 1-(4-fluorophenyl)-4-(4-phenyl-4-propoxy-piperidino)-1-butanol hydrochloride melting at about 190. 4–193° C.

*Example 41*

To a solution of 9 parts of 1-(δ-benzoylbutyl)-4-methoxy-4-phenylpiperidine isolated from its hydrochloride in 80 parts of ethanol is added portionwise 0.48 part of sodium borohydride. After the addition is complete the mixture is stirred for 10 hours at room temperature. The precipitate which forms is filtered off and the filtrate is evaporated. The original precipitate is combined with the residue and dissolved in water. After acidification with 2 N hydrochloric acid the aqueous solution is alkalized with sodium hydroxide and extracted with chloroform. The organic layer is dried. The solvent is evaporated and the residue is recrystallized from acetone to give 1-phenyl-5-(4-methoxy-4-phenylpiperidino)-1-pentanol melting at about 81.5–83° C.

*Example 42*

The procedure of Example 41 is repeated but an equivalent quantity of 1-(δ-benzoylbutyl)-4-ethoxy-4-phenylpiperidine is substituted for the 1-(δ-benzoylbutyl)-4-methoxy-4-phenylpiperidine. In this case, the crude base obtained as product is dissolved in anhydrous ether and hydrogen chloride gas is introduced into the solution. The solvent is evaporated and the residue is recrystallized once from a mixture of acetone and n-dibutyl ether, once from 2-propanol and twice from ethyl acetate to give 1-phenyl-5-(4-ethoxy-4-phenylpiperidino)-1-pentanol hydrochloride melting at about 132–133° C.

*Example 43*

To a solution of 5.2 parts of 1-(δ-benzoylbutyl)-4-phenyl-4-propoxypiperidine (isolated from its oxalate) in 160 parts of ethanol is added 0.5 part of sodium borohydride at room temperature. The solvent is evaporated from the reaction mixture and the residue is decomposed with 5 N hydrochloric acid on ice. This aqueous solution is alkalized and extracted with chloroform. The organic layer is dried over potassium carbonate, filtered, and evaporated. The dark oily residue is dissolved in a mixture of 240 parts of diisopropyl ether and 8 parts of ethanol and the solution is filtered over activated charcoal and evaporated. The residue is dissolved in 2-propanol and boiled with a solution of 3 parts of oxalic acid dihydrate in 60 parts of 2-propanol. On cooling the resultant mixture for 2 days at −20° C. there is obtained 1-phenyl-5-(4-propoxy-4-phenylpiperidino)-1-pentanol oxalate melting at about 104–108° C.

What is claimed is:

1. A compound of the formula

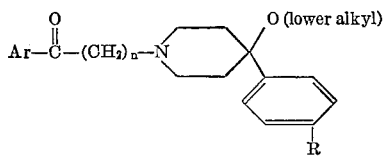

wherein Ar is selected from the group consisting of phenyl, tolyl, fluorophenyl, methoxyphenyl, and thienyl; R is selected from the group consisting of hydrogen and methyl; and n is a positive integer greater than 1 and less than 5.

2. A compound of the formula

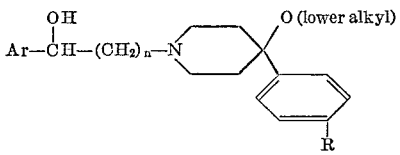

wherein Ar is selected from the group consisting of phenyl, tolyl, fluorophenyl, methoxyphenyl, and thienyl; R is selected from the group consisting of hydrogen and methyl; and n is a positive integer less than 5.

3. 1-(β-benzoylethyl)-4-ethoxy-4-phenylpiperidine.
4. 1-(γ-benzoylpropyl)-4-ethoxy-4-phenylpiperidine.
5. 1-[γ-(4-fluorobenzoyl)propyl]-4-ethoxy-4 - phenylpiperidine.
6. 1-(β-thenoylethyl)-4-ethoxy-4-phenylpiperidine.
7. 1-phenyl-2-(4-propoxy - 4 - phenylpiperidino) - 1-ethanol.
8. 1-phenyl-3-(4-ethoxy - 4 - phenylpiperidino) - 1-propanol.
9. 1-(2-thienyl)-3-(4-ethoxy-4-phenylpiperidino) - 1-propanol.

References Cited in the file of this patent
UNITED STATES PATENTS 2,932,646    Biel    Apr. 12, 1960
2,962,501    Cutler et al.    Nov. 29, 1960
2,973,363    Janssen    Feb. 28, 1961

OTHER REFERENCES

Janssen, Australian patent application, abstract No. 47,999/59, open to public inspection Oct. 22, 1959.